United States Patent [19]
Durkee

[11] 4,450,002
[45] * May 22, 1984

[54] HEAVY METAL REMOVAL PROCESS

[76] Inventor: Richard G. Durkee, 16780 Tin Mountain Cir., Foutain Valley, Calif. 90212

[*] Notice: The portion of the term of this patent subsequent to Oct. 13, 1998 has been disclaimed.

[21] Appl. No.: 310,989

[22] Filed: Oct. 13, 1981

Related U.S. Application Data

[63] Continuation-in-part of Ser. No. 115,039, Jan. 24, 1980, Pat. No. 4,294,434, which is a continuation-in-part of Ser. No. 173,321, Jul. 29, 1980, Pat. No. 4,304,599.

[51] Int. Cl.³ .............................................. C22B 15/12
[52] U.S. Cl. ................................... 75/0.5 A; 75/109; 75/117; 75/99; 423/112; 423/122; 423/556
[58] Field of Search ................... 266/79, 81, 101, 170; 75/109, 0.5 A, 97 A, 101 BE, 117, 99; 423/122, 112, 556

[56] References Cited
U.S. PATENT DOCUMENTS

| | | | |
|---|---|---|---|
| 2,842,436 | 7/1958 | Dasher | 423/150 |
| 3,840,365 | 10/1974 | Hammes | 75/109 |
| 3,874,940 | 4/1975 | Vera | 75/109 |
| 3,893,659 | 7/1975 | Krish | 75/109 |
| 3,900,314 | 8/1975 | Hulsebos | 75/109 |
| 3,902,896 | 9/1975 | Borbely | 75/109 |
| 4,152,143 | 5/1979 | Kausel | 75/109 |
| 4,252,622 | 2/1981 | Freeman | 75/109 |
| 4,294,434 | 10/1981 | Durkee | 266/170 |
| 4,304,599 | 12/1981 | Durkee | 75/109 |

Primary Examiner—Edward J. Meros
Assistant Examiner—Robert L. Stoll
Attorney, Agent, or Firm—Thomas A. Turner, Jr.; Seymour A. Scholnick

[57] ABSTRACT

A gravity fed water bath process treats waste water from spray rinses containing compounds of copper and like heavy metals. For displacing heavy metals, such as copper, the bath has a substantially pure metal with an electrode potential greater than the heavy metal contained in the rinse water. A system for controlling the pH level of the water bath treatment and for supplying acid at the beginning of the bath, and alkaline material at the bath's end provides a highly acidic pH level for the water bath and heavy metal removal chamber, and adjusts the pH level of the discharged water for satisfactory deposit in municipal sewer systems.

A method for displacing the heavy metal from the compound in solution requires exposing the heavy metal compound to a substantially pure metal having an electrode potential greater than the heavy metal of the compound, in an acidic bath whose pH level is controlled. The control of the pH is accomplished by acid sensing probes connected in circuit with a valve control which injects and mixes acid in the bath of a treatment chamber.

4 Claims, 4 Drawing Figures

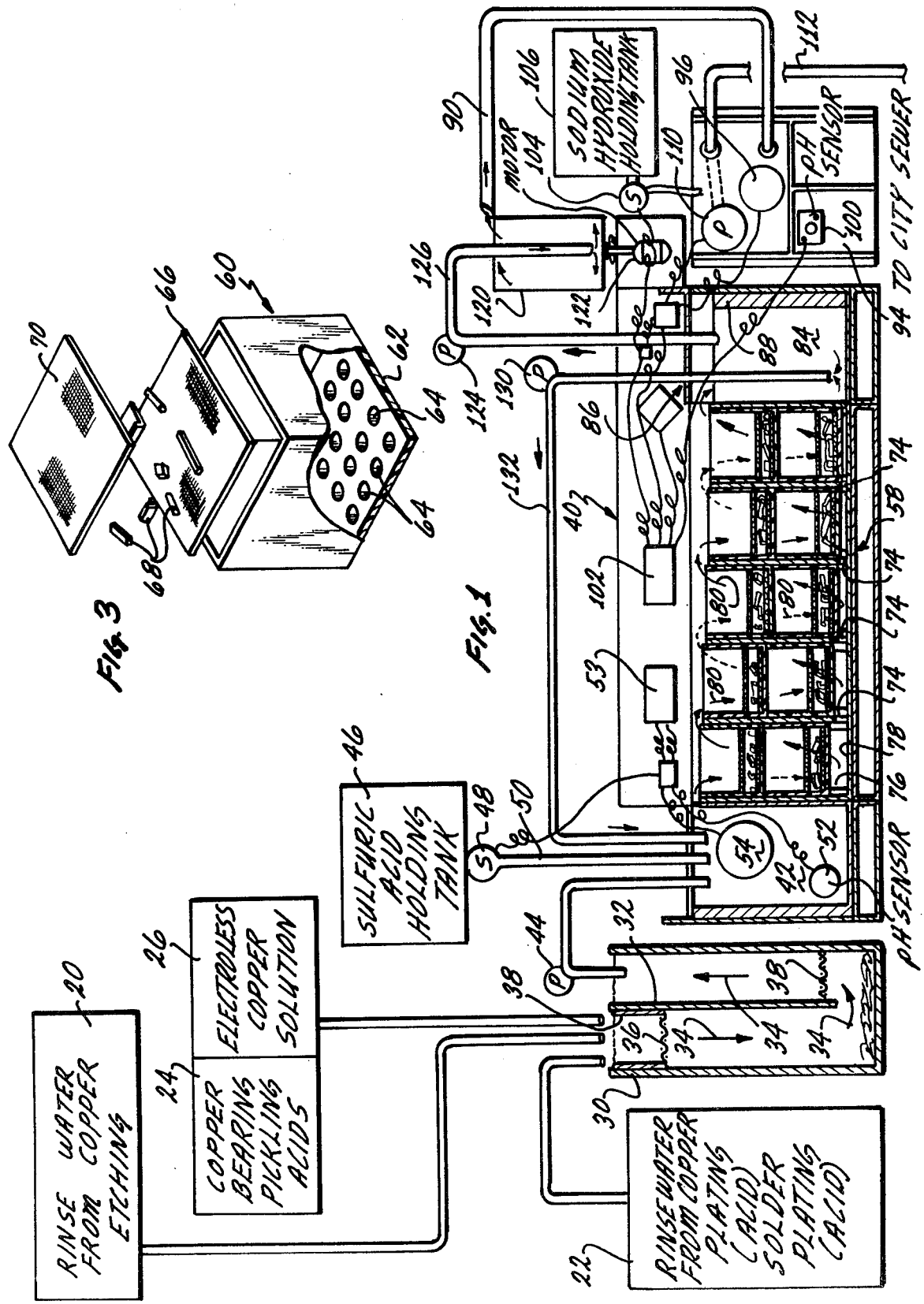

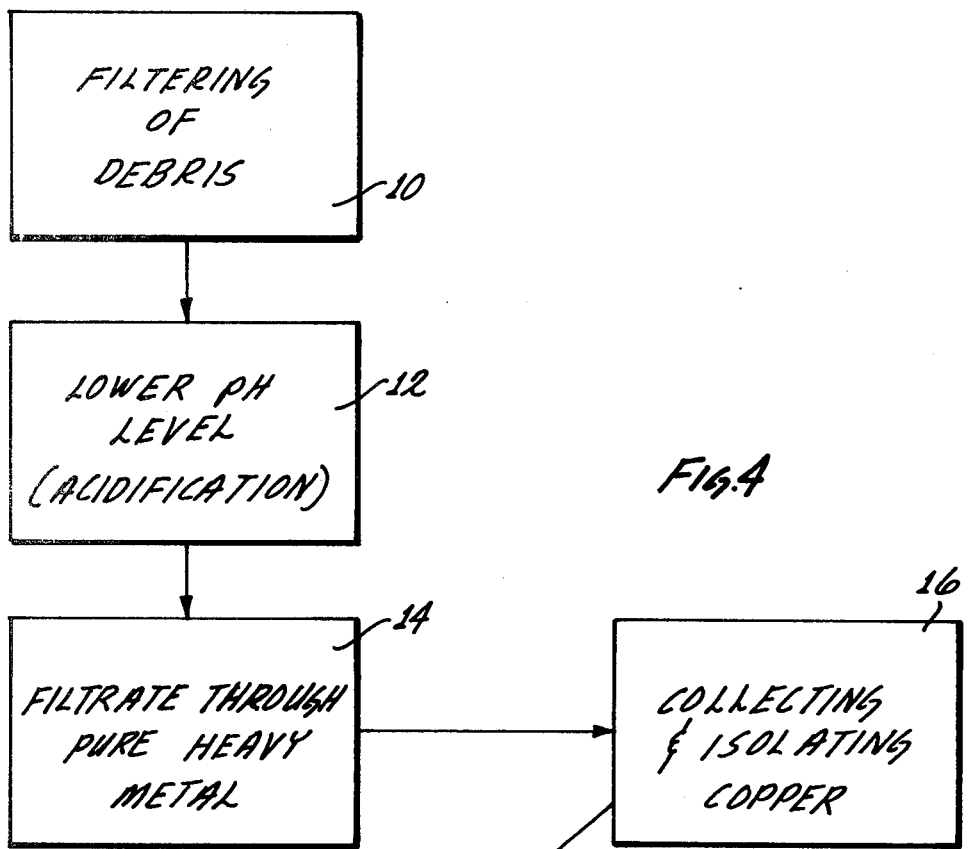
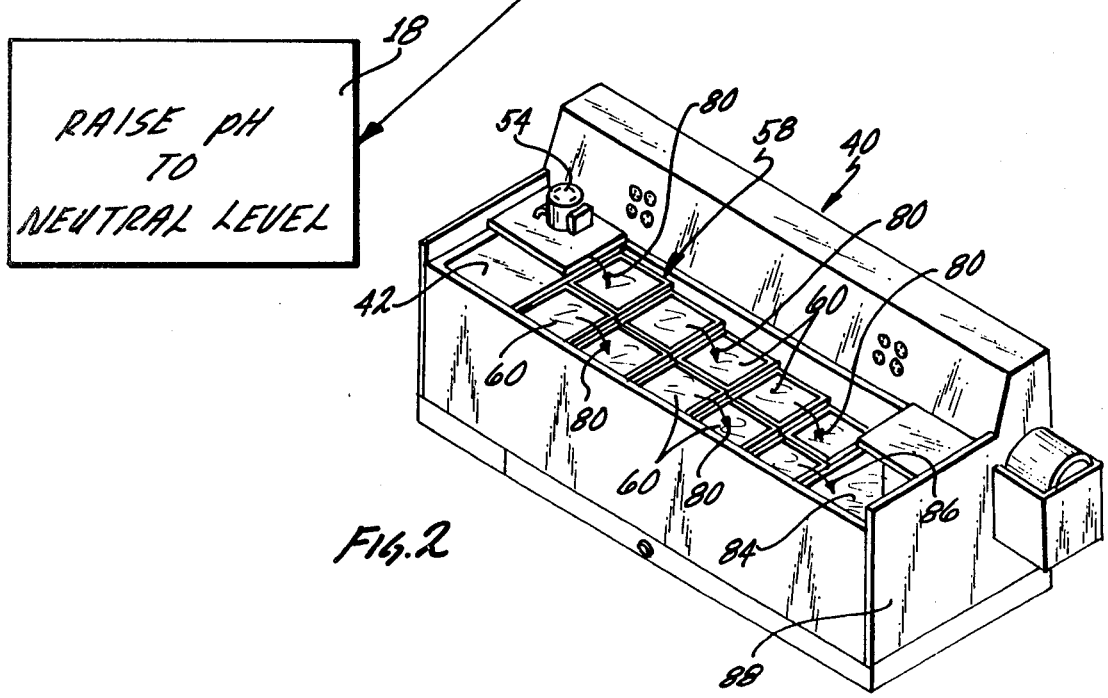

HEAVY METAL REMOVAL PROCESS

CONTINUATION-IN-PART APPLICATION

This application is a continuation-in-part of my copending application Ser. No. 115,039, filed Jan. 24, 1980, now U.S. Pat. No. 4,294,434. This application, further, is a continuation-in-part of my pending application Ser. No. 173,321, filed July 29, 1980, now U.S. Pat. No. 4,304,599.

BACKGROUND OF THE INVENTION

1. Field of the Invention

The present invention relates to the art of treating heavy metal-bearing aqueous solutions used in plating and metal finishing Processes, and more particularly relates to the reduction or displacement of poisonous heavy metals such as copper from waste waters for preparing the waste water prior to discharge in municipal sewers.

2. Description of the Prior Art

Heavy metal plating is accomplished frequently by an aqueous solution or bath process which can be electrolytic or electroless. In almost all cases, high concentrations of the heavy metal are maintained. If the heavy metal is poisonous, such as, for example, copper (Cu), or is otherwise objectionable, problems are presented when excess solutions must be discharged. For example, copper and copper-bearing compounds are usually not permitted above limited concentrations in municipal sewer systems, and therefore the copper must be reduced below the concentration limits. In the case of metal hydroxides, for example, a common method of reducing concentration is precipitation. Hereinafter in this specification and in the claims, the term "precipitate" will be used to mean the separating in solid form of a substance from a liquid as the result of a chemical or of a physical change, as from the addition or subtraction of electrons or electron energies. An attempt is made to collect the precipitate in a filter and to deposit the filtrate in municipal dumps. This method of elimination is unsatisfactory and only partially successful, because the metal hydroxide dissolves and percolates back into the underground water table. Another method of reducing concentration amounts is to add very substantial amounts of water.

Heavy metal plating techniques are used often in the manufacture of printed circuit boards. Printed circuit boards and printed wire boards are manufactured in the United States principally by photographic techniques at the present time. These techniques involve the plating of the substrate fiberglass or silicon with an electrically conductive metal, frequently copper (Cu), which covers the entire circuit board. Photographic etching techniques are then employed to remove the copper from the areas of the board which are intended to be non-conductive in accordance with a circuit pattern predetermined by the design engineer.

The copper is removed by etching techniques which frequently call for covering the copper-plated circuit board only over those particular areas which are to be conductive, thus exposing the copper in the plated area which is to be removed. Acid or alkaline etchants are used to etch the exposed copper. The etched copper, very often in the form of copper sulface ($CuSO_4$), is rinsed away in solution by a flush or rinse of water. Hereinafter in this specification, the term water will be used to mean any liquid or fluid effluent comprising heavy metal or other contaminants, unless it is indicated that thismeans otherwise.

Copper is poisonous, and the discharge of water containing any substantial amount of copper in the municipal sewer system frequently subjects the manufacturer to stiff penalties. In addition, the environmental systems of the watersheds and water bodies receiving the effluent are quite detrimentally altered. The customary method in the industry of removing the copper is to introduce great amounts of alkaline material as may be necessary, which reduces the $CuSO_4$ to copper-hydroxide ($Cu(OH)_2$). The $Cu(OH)_2$ is fluffy in water, and forms a slime on the bath chamber. Some solutions of $CuSO_4$ and alkaline sulfate double salts such as $KCuSO_4.6H_2O$ may also be poisonous. The fluffy slime mentioned hereinabove concerns conservationists and environmentalists when it appears in the municipal effluent.

In its pure, anhydrous form, $CuSO_4$ is a colorless salt which readily absorbs water to form the blue pentahydrate [$CuSO_4.5(H_2O)$] known as "blue vitriol." Copper is very poisonous in all of its forms to low organisms, especially algae, and is used in controlled amounts in swimming pools and water works to prevent the growth of such organisms.

It has long been desired to have a process for removing such objectionable heavy metal from the bath water in industrial systems, and which reduce water requirements. It has further been sought to remove such objectionable heavy metal while leaving a substantially clear liquid having essentially a neutral pH without fluff, slime and similar debris, so that the substantially clear neutral and non-poisonous liquid can be drained into municipal sewer systems without endangering the environment or subjecting the plant to severe sewer fines.

SUMMARY

In brief, in accordance with one aspect of the present invention, a method of removing copper from the etch rinse in a printed circuit board manufacturing process is described. The rinse water from copper etching, copper plating and solder plating processes, as well as the water from copper bearing pickling acids and electroless copper solutions are collected in a chamber which initially filters debris from the liquid. The rinse water containing substantial amounts of copper-bearing compounds, is collected in a mixing tank where the pH level is lowered substantially by the addition and blending of sulfuric acid ($H_2SO_4$). Probes capable of sensing the pH, valve the flow of sulfuric acid to the blending chamber or mixing tank.

After adjusting the pH of rinse water, making it highly acidic, the rinse water flows into a displacement chamber in a path for approximately three hours. In this flow, the rinse water filtrates over substantially pure metal aluminum. The copper is replaced by aluminum in the sulfate compound, and the copper Precipitates as pure metal copper to the bottom of the displacement chamber. The water is then discharged into a second mixing tank.

The second mixing tank may be a collection tank for not only the copper removal process described here, but also for the effluent from other processes in the plant. The second mixing tank is the last processing of the rinse water prior to its discharge into the municipal sewer system. In this second mixing tank, the pH is raised to a neutral level by the addition of sodium hydroxide (caustic) from a conveniently placed caustic (NaOH) holding tank. A pH sensing probe controls a valve which regulates the flow of NaOH into the collected effluent. The effluent from the collection chamber is pumped or otherwise directed into the sewer system in a substantially copper-free, acid neutralized water which is reasonably clear, free of slime and generally within standard municipal sewer acceptability guidelines.

An apparatus for carrying out the copper reclaiming process is described having a displacement chamber wherein the liquid can filtrate in a relatively small space for approximately three hours over relatively pure metal tailings held at various predetermined points along the flow path. Initially, a relatively deep collecting chamber receives the rinse water from the copper etching, copper plating and solder plating processes, and filters the masks, fiberglass chips and other debris before the liquid is pumped to an acidifying and mixing chamber. The liquid flows from the acidifying and mixing chamber into the displacement chamber where it follows a generally labyrinthine path to filtrate over the relatively pure metal tailings by gravity feed. A trough underneath the displacement chamber collects the pure metal copper being displaced in the process. A splash guard protects the area surrounding the displacement chamber, and directs the liquid to a second mixing chamber. The second mixing tank collects the filtrated water.

Probes sensing the pH in both of the mixing chambers or tanks control valves to add chemicals for adjusting the pH level. The valve leading from a sulfuric acid holding tank to the acidifying and mixing chamber constantly maintains the liquid in the acidifying chamber at a pH of approximately 1.5 to 2.5. The mixing tank receiving the liquid from the displacement chamber has its pH raised to approximately neutral levels by the addition of caustic from a conveniently located holding tank. A solenoid valve connecting the caustic holding tank to the second mixing tank is controlled by electronic signals from the pH sensing probes.

Blending equipment is placed in each of the mixing tanks for blending the chemical, either acid or caustic, for achieving a more uniform pH throughout the tank. Pumps may assist the liquid in the final mixing tank to the city sewer system.

The aluminum or other relatively pure metal tailings are held in a box made from plastic that is inert relative to the metal which it contains, and inert with regard to the acids and the acidic nature of the liquid going through the displacement chamber. The box contains a grated flooring over which the tailings are placed, so that the liquid will flow through the grates and the tailings to filtrate, maximizing the surface area of relatively Pure metal exposed to the $CuSO_4$-bearing liquid.

Other novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be understood, however, that the drawings are for the purpose of illustration and description only, and are not intended as a definition of the limits of the invention.

BRIEF DESCRIPTION OF THE DRAWINGS

FIG. 1 is an elevational cross-section of a displacement chamber, and a partial, schematic block diagram illustrating the preferred embodiment of the present invention;

FIG. 2 illustrates in a perspective view the preferred embodiment of an apparatus for displacing copper in the present invention;

FIG. 3 is an exploded, partially cutaway view in perspective showing a relatively pure metal retaining box of the preferred embodiment of the invention; and FIG. 4 is a block diagram indicating the method of the present invention in schematic, block form.

DESCRIPTION OF THE PREFERRED EMBODIMENT

A system and apparatus is illustrated for removing or reclaiming copper from copper compounds in solution in the rinse water from copper etching, copper plating and solder plating processes in printed circuit board manufacturing techniques, reference being had initially to FIGS. 1 and 2. The rinse water from the copper etching process 20, and the rinse water from the copper plating and solder plating processes 22 are collected in a collecting chamber 30. Other residual and waste liquids containing copper, such as copper bearing pickling acids 24 and the electroless copper solutions 26 in the printed circuit board manufacturing process, are also collected in the chamber 30.

Collecting chamber 30 comprises a tank having a baffle 32 separating it into substantially two sections. The copper-bearing liquids will be introduced to the chamber 30 in one of the sections, and pumped out of the other section into the reactive chamber 40, which will be described in greater detail below. The flow of water through the collecting chamber 30 is indicated generally by the arrows 34.

In the intake section of the chamber 30, a wire mesh screen 36 is situated approximately one foot into the chamber for the Purpose of collecting fiberglass chips, mask debris and other trash which may find its way into the rinse water flow. Preferably, the screen 36 is part of a removable basket 38 so that the filtering screen 36 can be cleaned periodically. If desired, additional filtering screens, such as screen 38, can be placed in the flow 34 through the chamber 30.

The rinse water is then pumped by pump 44 into a mixing tank 42 in the reactive chamber 40. Mixing chamber 42 receives sulfuric acid from a sulfuric acid holding tank 46 through valve 48 and conduit 50. A pH sensing probe 52 provides electrical signals corresponding to the pH which are fed back to a pH meter and controls 53 which actuate the opening of valve 48. Thus, as the pH sensing probe senses more or less acid, the valve 48 is correspondingly closed or opened to maintain a desired pH level in tank 42. The pH sensing probe 52 and acid valve control system 53 are standard apparatuses conventionally available, and will not be described in any further detail herein, as it is considered that those skilled in the art are well aware of the operations of the sensing probes and valve control.

Blending equipment, marked "mixer" 54 is positioned within the mixing chamber to mix or blend the acid with the rinse water. The acidified rinse water then spills over into the displacement chamber 58. The displacement chamber comprises a series of tandem arranged boxes 60, a representative example being more particularly shown in FIG. 3 of the drawings in an exploded view. Each individual box 60 has a grated bottom 62 having holes 64 through which the liquid can pass. Resting on top of the grated bottom 62 is a sieve 66, such as screen mesh. Aluminum tailings 68 are sandwiched between sieve 66 and a covering screen mesh 70.

The displacement chamber 58 contains twenty such boxes 60 in five rows of four each, arranged two high. Each successive row is positioned slightly lower than the next preceding row so that the rinse water flowing from one row to the next will flow by gravity feed over the top of the baffles 74. The vertically tandem boxes 60, seen best in FIG. 1, rest on elevating blocks 76 to create a space or trough between the grate 62 of the lowermost box 60, and the floor 78 of the displacement chamber 58.

In each row, the rinse water flows down one column of vertically tandem boxes 60, and up the adjacent column. It is from this next adjacent column that the rinse water flows to the next lower row of boxes in the series to create a flow path denoted by the arrows 80. The aluminum tailings 68 held in the bottom of each box 60 are thus held at predetermined positions along the flow path 80.

In an experimental installation in an operating manufacturing plant, the displacement chamber 58, through which some 2000 gallons per day of contaminated water is processed, held approximately 230 gallons of water. In a standard shop, a maximum of 1.5 gallons per minute of water flow is usually considered sufficient to handle the heavy metal contaminated waste effluent, so that a complete flush through the displacement chamber 58 will take 2 hours and 45 minutes, or approximately 3 hours. Increasing the volume of the chamber and of the relatively pure metal, or increasing the temperature, will allow for a faster flow rate while maintaining the same amount of copper reduction. A more detailed explanation of the flow rate and displacement reaction will he given hereinbelow.

The rinse water flows through the space between the floor 78 and the lowermost box grate 62 once during the flow through each row. Copper being replaced by the aluminum settles to the floor 78 below the boxes 60, and thus is removed from the rinse water flow. The rinse water flowing into the final chamber 84, as indicated by arrow 86, is substantially free of very substantial amounts of the copper. A splash guard 88 may be provided to contain the rinse water within the reactive chamber 40.

The substantially copper-free rinse water is then directed into the plant's sewer system represented by conduit 90.

The copper-free rinse water collects into a second mixing tank 94. In the embodiment illustrated, selected waste water having principal concentrations of other metals from the printed circuit board manufacturing process is collected in tank 94. Similar to the acidification or mixing chamber 42, the tank 94 has a mixer 96 for blending the collected water. The tank 94 also has pH sensing probes 100 sending electrical signals corresponding to the pH level in the tank 94, to pH meter and valve controls 102. The pH meter and controls 102, similar to the pH meter and controls 53 for the acidification chamber 42, are standard devices available and known to those skilled in the art. The interior details will not be described further herein, except to note that the controls can be adjusted to regulate the liquid to any pH level desired.

The pH meter and controls 102 can operate the opening and closing of solenoid valve 104 for controlling the amount of caustic from the caustic or sodium hydroxide holding tank 106 going to tank 94. The collected waste water in tank 94 thus can have its pH regulated preparatory to being pumped or gravity fed into the city sewer. Optional pump 110 then pumps the waste water through conduit 112 into the external municipal sewer system or other waste disposal system.

In operation, rinse water containing principally copper sulfate, and possibly copper-ammonia complexes, cupric chlorides and electroless copper in solution are collected in collecting tank 30 after being strained through wire mesh 36 for filtering fiberglass chips, mask debris and other trash that might enter the rinse water. After passing under the baffle 32, further depositing debris on the floor of chamber 30, the filtered rinse water is pumped through pump 44 into the acidification and mixing chamber 42.

The pH sensing probes 52 convey electrical signals, corresponding to the pH level in the chamber 42, to the pH meter and controls 53, which in turn regulate the opening and closing of valve 48 controlling the acid introduced into the chamber 42.

It has been found that the most efficient acid is sulfuric acid, thus acidifying the rinse water solution to sulfonate the copper. It is preferred that a pH of 1.5 to 2.5 be maintained in the acidification chamber 42, so that the rinse water flowing through the displacement chamber 58 will be highly acidic. Increasing acidity (lowering pH) increases the rate of copper precipitation. Slightly less acidity on the order of pH 3 has been found to achieve less than satisfactory results.

The rinse water then flows for approximately three hours in the flow path 80 in the displacement chamber 58. In this flow path, the highly acidic rinse water passes over aluminum tailings 68 held at predetermined points along the flow path 80 in boxes 60. It has been found that 10 lbs. of aluminum tailings for each cubic foot, where the boxes 60 are conveniently approximately a cubic foot, has been an adequate quantity to produce extremely good results. It has also been found that 20 lbs. per cubic foot of the tailings is too much, tending to reduce the amount of reaction with the copper sulfate. There is, it is believed, a point below 10 lbs. per cubic foot which will be too fine of a distribution of the aluminum tailings, so that there will be not enough contact of the copper sulfate with the aluminum tailings to produce meaningful results.

During one experiment, approximately 2,000 gallons were processed through the displacement chamber 58. Using the structure as defined hereinabove, the copper contained in the effluent to the city sewer was reduced in quantity to approximately 1.25 parts per million. The contamination of copper being treated was initially 800 parts per million. The water processed into tank 94 contained approximately 50 parts per million. The water so processed is combined with the remaining effluent from the shop in tank 94 before alkalinization and discharge into the municipal sewer. The total amount of effluent was approximately 80,000 gallons for the 24 hour period, so that the discharge contained approximately 1.25 parts per million. This quantity is considered to be negligible and no serious threat to living organisms.

It is not known precisely what chemical reaction occurs in the displacement chamber, but it is determined that approximately 95% or better of the copper in the rinse water is deposited on the floor 78 of the displacement chamber in substantially pure metal form. It is believed that the sulfuric acid attacks the pure metal aluminum to place in the solution aluminum ions having a valence of plus three. It is observed that hydrogen gas is given off through the top of the displacement chamber. The electrons from the aluminum supply the necessary electron energies to reduce the copper ions so that pure copper metal is formed and drops to the chamber floor 78.

It is believed that the formation of hydrogen gas prevents the copper from firmly attaching onto the aluminum, a frequent result when copper sulfate in solution is exposed to aluminum in an essentially neutral environment. Perhaps the hydrogen gas keeps the copper agitated in solution. Also, the hydrogen gas may form between the surface of the aluminum and the copper developing as a pure metal, to drop the copper and prevent it from plating on to the aluminum. Heating the bath in the displacement chamber 58 20° F. or more also increases the rate of copper precipitation.

The aluminum is depleted periodically by the process, and must be replaced. Standard laboratory procedures and tests can be employed to determine if the copper quantity in chamber 84 is such as to indicate that the process is no longer reducing the copper in the indicated amounts. One such test involves sampling chamber 84 and combining a like volume of the sample with concentrated ammonium hydroxide ($NH_4OH$). A distinctly blue color indicates a passage of copper and an exhaustion of the tailings 68. The retaining boxes 60 are easily removed from the apparatus so that fresh aluminum tailings or turnings 68 can be inserted between the sieve 66 and screen 70 over the grate 62. Increasing the quantity of aluminum in the tailings 68 increases the degree of copper precipitation, within the density limits indicated above.

Using hydrochloric acid produces an uncontrolled reaction, the results of which cannot be predicted. Phosphoric acid ($H_3PO_4$), while chemically suitable in laboratory experiments, is not the acid of choice because of its high cost and because its use results in adding phosphates to the waste water. Phosphates are objectionable in the municipal sewer systems and the environment. On the other hand, nitric acid ($HNO_3$) in experiments passivates the aluminum, placing an oxide coating over it.

FIG. 4 is a schematic, block diagram of the invention illustrating the essential steps of removing the copper from the copper compounds in the rinse water from copper etchings, copper plating and solder plating baths as well as copper from copper bearing pickling acids and electroless copper solutions resulting from printed circuit board manufacturing techniques. The copper compounds in this rinse water most frequently are in the form of copper sulfate, although copper-ammonium complexes and cupric chlorides as well as some electroless copper and formaldehyde copper may be found in the rinse water. In addition, the rinse water frequently will contain fiberglass chips and parts of the resist mask material used to mask these areas on the fiberglass substrate which are to remain conductive after the etching process.

Since the etching steps in the photographic copper plating techniques in printed circuit board plants are frequently open and exposed to workers, additional debris such as cigarette butts, trash and the like may be found in the rinse water. The rinse water is thus initially filtered, as indicated in block 10 of the schematic of FIG. 1. In the preferred embodiment, the rinse water is acidified in block 12 having its pH lowered to approximately between 2.0 and 3.3 The rinse water is then flowed or passed through essentially pure metal. This metal is preferably substantially pure aluminum, but could be other metals such as iron. While aluminum and iron are known to work, it is believed that any metal stable in an aqueous acid solution having a relative position on the electromotive force table of elements greater than copper, will alternatively achieve results. Experiments with iron and aluminum have shown that the speed and rate of reaction resulting in the precipitation of copper will depend on the relative activities of the metals. Thus, aluminum is substantially faster acting than iron. Among these metals believed to be useful are magnesium and manganese.

In the filtration process 14, the aluminum substitutes for the copper in the $CuSO_4$ compound, precipitating the copper in a substantially pure metal form 16.

The system described hereinabove appears to work where the acid level is maintained at a pH of less than 2. It is often times desired, however, to reduce the acid level not only to economize on the acid required, but also to increase the useable life expected of the construction materials. It is known, however, that certain compounds including aluminum begin to cloud as the pH is raised. For example, aluminum cloride (AlCl) begins to cloud at a pH of approximately 3.2 to 3.3. It is known that aluminum sulfate ($Al_2(SO_4)_3$) clouds at some level, which is believed to be 3.2 to 3.3 pH.

If the pH of the system as described hereinabove is allowed to raise to levels of approximately 3.2 to 3.3, the effluant or discharge taken from the system appears to have substantial portions of copper in suspension. If the pH is allowed to increase above 3.3, the effluant is heavily clouded with a flow which tends to gum and to clog the effluant and, most probably, the sewer system also. More significantly, the copper in suspension, when tested with a nitric acid digestion test, appears to show substantially more copper in suspension. Further, if this cloud or slime of aluminum base material is allowed to develop in the system, it has been discovered that an amount of copper sulfate $CuSO_4$ is precluded from reacting with the substantially pure aluminum so as to reduce the copper ions into metallic copper. The clouds of slime apparently form a surface on the substantially pure aluminum to coat the aluminum so that the reaction between the copper sulfate $CuSO_4$ and the aluminum Al is substantially impeded.

It is further believed that such clouds of aluminum based slime have the ability to entrap copper Cu which is in suspension, and to hold such fine particles as the aluminum based slime is allowed to pass through the system and into the effluent. If given sufficient time, the aluminum based slime will settle out of the solution. Nonetheless, when tests for copper are made, such as the nitric acid digestion test, the solution goes into a very low pH or high acid condition. The aluminum based slime then reverts into solution at the low pH, and the copper Cu shows as an element in the effluent solution.

The copper, as a result of the foregoing system, and if the pH is maintained at such a level as to prevent the formation of aluminum based slime clouds is substantially metallic copper, although substantial portions of the metallic copper are in a very fine, small size of the order of five microns. It may be possible to filter such particles of metallic copper, but the speed of such systems are undoubtedly slow for most industrial applications. It has been found that the fine metallic copper can be physically separated from the solution by increasing the gravitational forces in the solution to between two hundred times and four hundred times the gravitational force of 14 pounds per square inch. Such gravitational forces can be achieved by a centrifuge 120 rotated at up to seventeen hundred rounds per minute by motor 122, reference being had again to FIG. 1 of the drawings. The solution is pumped by pump 124 through pipe 126, and deposited substantially at the lower end of the centrifuge 120. The solution is rotated within centrifuge 120 until it reaches the top, where it overflows or is flung into conduit it 90 for deposition in the alkalization chamber 94. Experimental tests have resulted in the substantially complete elimination or separation of the metallic copper from the solution for all copper particles of the order of five microns or larger.

In operating at acid levels having a pH greater than 2, however, it it found that the speed of the copper sulfate $CuSO_4$—aluminum Al inter-reaction is substantially slurred. The speed of this reaction can be increased by recirculating the solution at the end of the path in the reaction chamber, back to the beginning of the reaction chamber path. Such recirculation can be accomplished by a pump 130 pumping the solution from the final chamber 84 to the acidification chamber through pipe 132 as shown in FIG. 1. By regulating the flow in pipe 132 by the pump 130, the speed in the reaction chamber path 80 can be increased as desired. It has been found that very satisfactory results are achieved when the flow rate in path 80 is increased to approximately nine times that of the flow rate caused by gravity alone. Thus, for example, if the normal flow rate of rinse water solution is approximately three gallons per minute, increasing the flow rate in path 80 to approximately 28 gallons per minute will result in the substantially complete reaction of the copper sulfate with the aluminum so that substantially all the copper reduces to the metallic form.

As illustrated in the block diagram of FIG. 4, a new step is added to the system, in which step the metallic copper is physically separated, or collected and isolated from its suspension in the solution. This physical separation is accomplished for the smallest metallic copper particles, down to approximately five microns in size. When such physical separation is complete, as indicated in block 16, the pH level can be raised to neutral, non-acidic levels as indicated in block 18, for disposition in municipal sewer systems.

The foregoing detailed description of my invention in a preferred embodiment both as to apparatus and as to method is illustrative of several embodiments. It is to be understood, however, that additional embodiments may be perceived by those skilled in the art. Such additional embodiments, for example, would encompass the treatment of any highly concentrated heavy metal aqueous solutions such as spent plating baths or concentrated waste. The embodiments described herein together with those additional embodiments are considered to be within the scope of the present invention.

I claim:

1. A method of reclaiming heavy metal from a heavy metal finishing process, which produces a liquid comprising an aqueous solution of the heavy metal, comprising the steps of:
   a. establishing the aqueous solution to a pH less than 3.3 to establish in said solution heavy metal in ionic form;
   b. flowing at a rate at least faster than that rate generated by gravity the aqueous solution containing the heavy metal in a path including a supply of substantially pure aluminum metal, the aluminum having a relative electrode potential greater than that of the reclaimed heavy metal in the aqueous solution to precipitate the heavy metal and replace it with ionic aluminum in the aqueous solution; and,
   c. mechanically separating the heavy metal in metallic form from said aqueous solution while maintaining the aqueous solution substantially free of clouds formed by aluminum salts resulting from said ionic aluminum.

2. The method of claim 1 further comprising the step of increasing the flow rate of the aqueous solution in the flowing step to a rate at least eight times that rate generated by gravity.

3. The method of claim 1 wherein the physically separating step the gravitational force on said solution is increased to at least 250 times that force generated by gravity.

4. The process of precipitating and reclaiming substantially pure metal copper in aqueous solution in ionic form by exposing substantially pure metal aluminum to said aqueous solution and flowing the solution at the surface of said aluminum at a rate at least eight times that flow rate generated by gravity sufficiently to prevent the formation of substantially pure metal copper plating on said aluminum, and preventing the clouding by aluminum based compounds by maintaining the acidification of the solution to a pH less than 3.3.

* * * * *